(12) United States Patent
Sethi et al.

(10) Patent No.: US 11,500,699 B2
(45) Date of Patent: Nov. 15, 2022

(54) COMMUNICATION OF DATA BETWEEN VIRTUAL PROCESSES

(71) Applicant: HEWLETT PACKARD ENTERPRISE DEVELOPMENT LP, Houston, TX (US)

(72) Inventors: Aseem Sethi, Karnataka (IN); Mark Andrew Denny, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 367 days.

(21) Appl. No.: 16/256,171

(22) Filed: Jan. 24, 2019

(65) Prior Publication Data
US 2020/0241940 A1 Jul. 30, 2020

(51) Int. Cl.
*G06F 9/54* (2006.01)
*G06F 9/455* (2018.01)

(52) U.S. Cl.
CPC .......... *G06F 9/545* (2013.01); *G06F 9/45558* (2013.01); *G06F 2009/45587* (2013.01); *G06F 2009/45595* (2013.01)

(58) Field of Classification Search
CPC ................. G06F 9/545; G06F 9/45558; G06F 2009/45587; G06F 2009/45595
See application file for complete search history.

(56) References Cited

U.S. PATENT DOCUMENTS

| 7,424,710 | B1* | 9/2008 | Nelson | H04L 69/32 718/1 |
| 9,208,328 | B2 | 12/2015 | Russello et al. | |
| 9,729,441 | B2 | 8/2017 | Sunavala et al. | |
| 2005/0273858 | A1 | 12/2005 | Zadok et al. | |
| 2008/0240130 | A1* | 10/2008 | Oved | H04L 49/90 370/401 |
| 2009/0183180 | A1* | 7/2009 | Nelson | G06F 9/45533 718/1 |
| 2012/0096271 | A1* | 4/2012 | Ramarathinam | H04L 63/168 709/227 |
| 2020/0004725 | A1* | 1/2020 | Ben Dayan | G06F 16/182 |

FOREIGN PATENT DOCUMENTS

WO    WO-2017148512 A1    9/2017

OTHER PUBLICATIONS

Techopedia, Jan. 3, 2014, Network Address, <https://www.techopedia.com/definition/20969/network-address>, 2 pages. (Year: 2014).*

(Continued)

*Primary Examiner* — S. Sough
*Assistant Examiner* — Carina Yun
(74) *Attorney, Agent, or Firm* — Trop, Pruner & Hu, P.C.

(57) ABSTRACT

An interface module in a user space intercepts a call from a first virtual process, the call to cause communication of data from the first virtual process to a second virtual process. The interface module accesses mapping information to redirect the communication of data to the second virtual process without passing through the protocol stack of a kernel, the mapping information comprising entries each including network addresses used in identifying a respective connection between corresponding virtual processes.

19 Claims, 5 Drawing Sheets

(56) References Cited

OTHER PUBLICATIONS

Barghi, Saman, How to Wrap a System Call (Libc Function) in Linux, Sep. 5, 2014, Retrieved from the Internet on Sep. 11, 2018 from URL: <samanbarghi.com/blog/2014/09/05/how-to-wrap-a-system-call-libc-function-in-linux/> (13 pages).

Corbet, Jonathan, LWN.net, Glibc wrappers for (nearly all) Linux system calls, Aug. 20, 2015 (11 pages).

gnu.org, Connections (The GNU C Library), 16.9 Using Sockets with Connections downloaded Nov. 11, 2018 (1 page).

gnu.org, Sockets (The GNU C Library), 16 Sockets downloaded Nov. 11, 2018 (2 pages).

Gupta, Abhishek et al., A Scalable Approach for Service Chain (SC) Mapping with Multiple SC Instances in a Wide-area Network, Aug. 2015, Retrieved from the Internet on Sep. 11, 2016 from URL: <arxiv.org/pdf/1709.04772.pdf> (13 pages).

stackoverflow.com, What is the difference between a port and a socket? downloaded Nov. 11, 2018 (19 pages).

Wikipedia, File descriptor last edited Oct. 3, 2018 (4 pages).

Wikipedia, GNU C Library last edited Aug. 31, 2018 (6 pages).

Wikipedia, Wrapper function last edited Jun. 7, 2018 (2 pages).

Zhang, Liuhang et al., P-socket: Optimizing a Communication Library for a PCIe-based Intra-rack Interconnect, May 2016, Retrieved from the Internet on Sep. 11, 2018 at URL: <P-socket: Optimizing a Communication Library for a PCIe-based Intra-rack Interconnect> (9 pages).

\* cited by examiner

COMMUNICATION OF DATA BETWEEN VIRTUAL PROCESSES

BACKGROUND

Virtual processes are entities (in the form of machine-readable instructions) that emulate respective physical entities. For example, a virtual process can include a virtual machine (VM), which emulates a physical machine such as a computer or other electronic device. A VM does not itself include physical resources like those of a physical machine, but is able to access a portion of physical resources of one or more physical machines to perform a task of the virtual machine.

Another example of a virtual process is a virtual network function (VNF) that is used in network function virtualization. A VNF can refer to a virtual entity that is to perform corresponding network-related tasks. Deploying VNFs as part of network function virtualization can be associated with various example benefits. For example, a VNF can be designed, configured, and deployed in a network more quickly than a hardware network component. Moreover, in general, VNFs are less costly than respective hardware network components for performing corresponding network-related tasks. In addition, a VNF is more easily customizable than hardware network components to target specifications of different users.

A system can include virtual processes that are able to perform respective tasks. Examples of virtual processes include virtual machines, virtual network functions (VNFs), and so forth. Virtual processes are able to communicate with one another.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A collection of interconnected VNFs can be deployed on one computing node or across multiple computing nodes. In some examples, the collection of interconnected VNFs includes a chain of VNFs, where the different VNFs in the chain can successively perform respective network-related tasks on certain units of data in the network. In other examples, a collection of interconnected VNFs can include some subset of the VNFs connected in a chain and another subset of the VNFs connected in parallel. More generally, a collection of interconnected VNFs refers to any group of VNFs that are functionally, logically, and/or physically connected or related to one another.

Examples of different types of VNFs include the following: a virtualized load balancer to balance network communication across multiple network paths of a network, a virtualized firewall that protects a network from unauthorized intrusion from outside the network, a virtualized intrusion detection device to detect intrusion into a network by an unauthorized entity, a virtualized switch or router to switch or route data packets based on network addresses and possibly other fields in the data packets, and so forth.

Although reference is made to VMs or VNFs as examples of virtual processes, it is noted that in other examples, other types of virtual processes can be invoked. A virtual process can be implemented as machine-readable instructions executed on a computing node (or multiple computing nodes). As used here, a "computing node" can refer to a computer, a processor, multiple processors, or any other physical infrastructure that is capable of executing machine-readable instructions.

Virtual processes can communicate with one another. In some examples, the virtual processes can perform communications with one another using a protocol stack of a kernel. A kernel of an operating system (OS) can refer to any portion of the OS that is designated to perform selected tasks of the OS, such as managing hardware components, managing communications, managing processes, managing data, and so forth.

The protocol stack of the kernel can include protocol layers that perform communications according to respective communication protocols. For example, the protocol layers can include a transport layer and a network layer. Examples of the transport layer include a Transmission Control Protocol (TCP) layer, a User Datagram Protocol (UDP) layer, and so forth. A TCP layer is able to establish a TCP connection over which data packets are communicated between endpoints, such as virtual processes. TCP provides for reliable, ordered, and error-checked delivery of data between TCP layers associated with the endpoints. A UDP layer performs communications of data packets in a connectionless manner.

An example of a network layer is an Internet Protocol (IP) layer, which communicates data packets between endpoints (e.g., virtual processes) including IP addresses (such data packets can be referred to as "IP packets" or "IP data packets"). In an example system, the IP addresses of the endpoints may be network addresses translated (NATed) so that a physical network interface can support multiple virtual network interfaces. One or more such virtual network interfaces correspond to each virtual process. In certain such systems, a virtual switch may forward network traffic to the appropriate virtual network interface dependent on the destination virtual IP address of the network traffic. In other examples, other types of network layers can be employed. In some examples, TCP or UDP messages can be carried in IP packets.

If a data packet from a first virtual process to a second virtual process is passed through a protocol stack of a kernel, then context switching between a user space and a kernel space may be involved. A kernel space refers to a portion of memory space (in a system) in which machine-readable instructions of the kernel execute. A user space refers to a portion of the memory space in which machine-readable instructions of user processes are executed. Although the kernel may access the user space, user processes are prevented from accessing the kernel space except through certain interfaces that expose (e.g., through system calls) portions of the kernel space in a restricted manner. A "user process" can refer to any process of a program that is executed without full hardware access permissions, including access to an assigned sub-portion of user space memory, access to a subset of processor instructions, and access to other hardware devices (e.g. network interface card) only via system calls. An OS may enforce multiple layers of access, with each successive reduction in privileges corresponding to the proper operation of certain classes of user processes (e.g., device drivers may have more complete access to certain hardware than an application program). As an example, a user process can include a process of an application program, a virtual process, and so forth.

When a data packet is passed through the protocol stack of the kernel, a first context switch can occur in response to the data packet passing from the first virtual process (in the user space) to the protocol stack of the kernel (in the kernel space). A context switch refers to switching an execution state of a processing resource between a first context (the context of the first virtual process in the user space) and a second context (the context of the protocol stack in the kernel space). The context switch may be performed in response to a virtual process executing a system call, such as a TCP/IP "send" system call. A "context" can refer to information relating to machine-readable instructions and other information (e.g., data in an accessible region of memory, hardware settings, etc.) that relates to execution of the machine-readable instructions. A "processing resource" can refer to a hardware processing circuit, which can include any or some combination of a microprocessor, a core of a multi-core microprocessor, a microcontroller, a programmable integrated circuit, a programmable gate array, a digital signal processor, or another hardware processing circuit.

The protocol stack delivers the data packet to the second virtual process. If the second virtual process responds with a data packet, the response data packet also passes through the protocol stack of the kernel, which also leads to a further context switch of the processing resource.

Context switching of a processing resource when communicating data packets can be inefficient, since each context switch can consume both time and the bandwidth of the processing resource. If there are a large number of data packets communicated among a large number of virtual processes, then the corresponding context switches of the processing resource can slow down overall system performance, and can reduce the availability of the processing resource for other processes.

In accordance with some implementations of the present disclosure, an interface module in the user space is used to intercept (also referred to as "hijack") a system call by a first virtual process to communicate data (as part of a network communication) to a second virtual process. The interface module includes machine-readable instructions that are executable in the user space rather than in the kernel space. The interface module responds to the intercepted call by accessing mapping information to redirect the communication of data from the first virtual process to the second virtual process without passing through the protocol stack of the kernel. The mapping information includes entries each including network information (including network addresses, network ports, and protocol information, for example) used in identifying a respective connection between corresponding virtual processes.

By intercepting a call and redirecting network communication of data by the interface module in the user space, the kernel is not invoked, and thus context switching of a processing resource between the user space and the kernel space can be avoided for the purpose of certain data communication between virtual processes.

Figure 1:
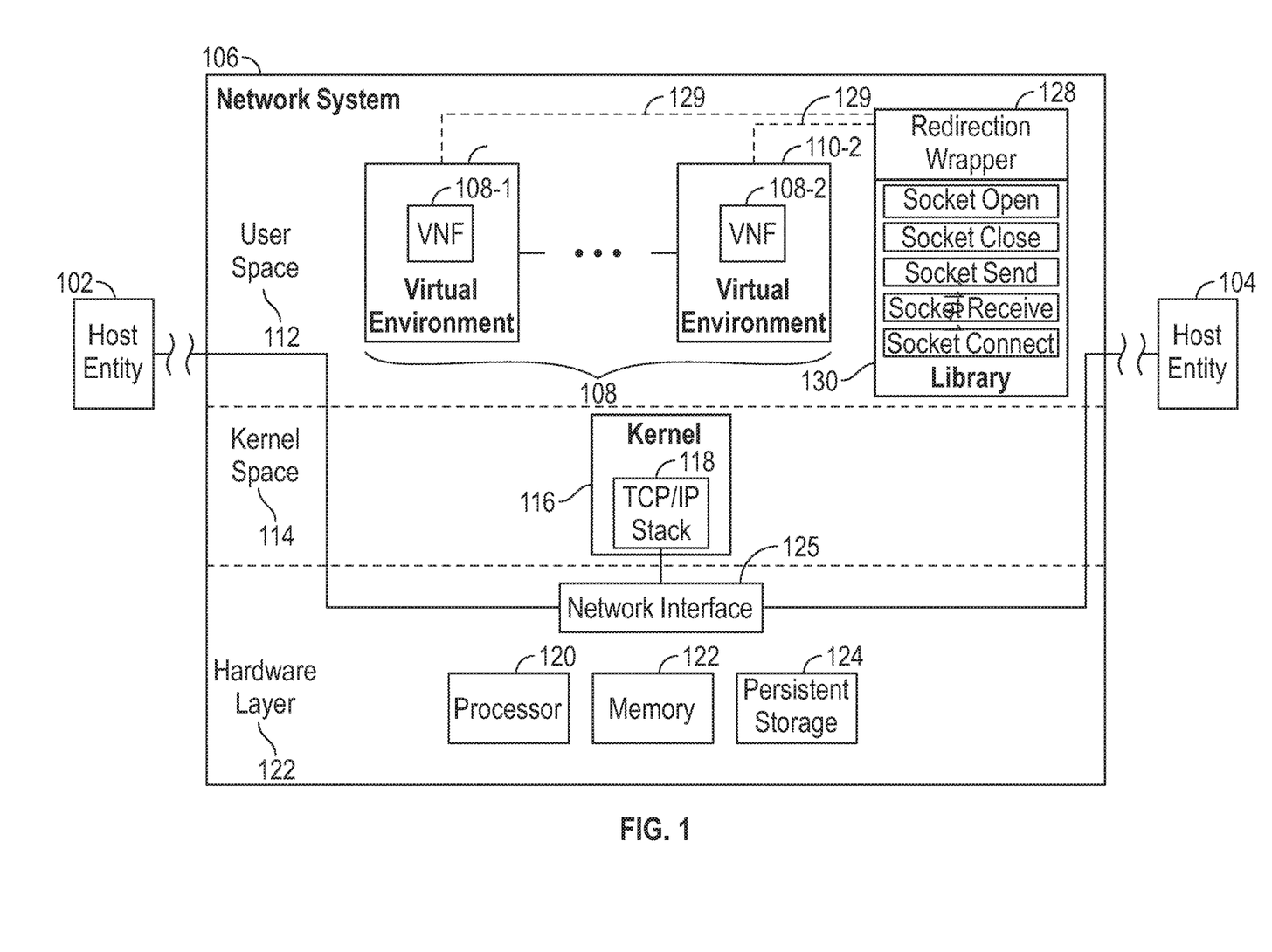
FIG. 1 is a block diagram of an arrangement including a network system according to some examples.

FIG. 1 is a block diagram of an example network arrangement that includes a first host entity 102 and a second host entity 104 that are able to establish a communication flow between the host entities 102 and 104 through a network system 106. Although the example of FIG. 1 shows just a pair of host entities 102 and 104, it is noted that in other examples, a communication flow can be established among more than two host entities. For example, the host entity 102 can include a sender that multicasts data to multiple receivers. Moreover, in other examples, there can be additional host entities involved in communications in respective communication flows.

A "host entity" can refer to an electronic device or a program (including machine-readable instructions) executable in a physical machine or virtual machine, where the host entity is able to establish a communication flow with another host entity. A host entity can be an endpoint of the communication flow. In some examples, a communication flow established between host entities can include communication of TCP/IP packets, UDP/IP packets, and so forth.

The network system 106 can be implemented using a single computer node or multiple computer nodes, where each computer node includes a respective set of physical resources including a processing resource, a storage resource, a communication resource, and so forth.

The network system 106 includes a collection of interconnected VNFs 108 through which a communication flow between the host entities 102 and 104 and/or other host entities can be established. In the example shown in FIG. 1, the collection of interconnected VNFs 108 includes VNFs 108-1 and 108-2 connected in a chain. In other examples, at least some of the VNFs can be connected in parallel between the host entities 102 and 104. Although two VNFs are shown in FIG. 1 as being part of a collection, it is noted that a different number (three or more) of VNFs can be used in a collection in other examples. Also, there can be multiple collections of interconnected VNFs established among various host entities for respective communication flows.

The VNFs 108-1 and 108-2 can be the same type of VNF (e.g., a router or switch), or can be different types of VNFs (e.g., one VNF is a router or switch, while another VNF is a firewall or a virtual intrusion detection device).

Each VNF can be implemented as machine-readable instructions, such as machine-readable instructions executed within a corresponding virtual environment 110-1 and 110-2. For example, each virtual environment can be in the form of a container, where one container is isolated from another container. In some examples, each virtual environment 110-1 and 110-2 does not include its respective OS, but rather uses the kernel 116 of the network system 106. As shown in FIG. 1, the VNFs 108-1 and 108-2 run in respective virtual environments 110-1 and 110-2 are part of a user space 112 of the network system 106.

In other examples, instead of VNFs run in respective containers, other types of virtual processes, such as VMs, can be employed.

The network system 106 further includes a kernel space 114 that includes a kernel 116. The kernel 116 includes a TCP/IP stack 118 that supports communication of data packets (TCP/IP packets). In other examples, a different protocol stack can be used, such as a UDP/IP stack or a different stack.

Traditionally, for a VNF in the user space 112 to communicate with another VNF, a data packet is sent through the TCP/IP stack 118 of the kernel 116. As discussed above, such data communication involves performing a context switch of a processing resource, which can be inefficient.

In the example of FIG. 1, the processing resource includes a hardware processor 120, which is part of a hardware layer 122 of the network system 106. The hardware layer 122 also includes a memory 124 and a persistent storage 126. In addition, the hardware layer 122 can also include a physical network interface 125, such as a network interface controller (NIC), to perform communications over a network. The host entities 102 and 104 are communicatively coupled to the network interface 125, which is also coupled to the TCP/IP stack 118. Although just one processor 120 is shown in FIG. 1, it is noted that in other examples, the hardware layer 122 can include multiple processors. The memory 124 can be implemented using a memory device or multiple memory devices. Examples of memory devices include dynamic random access memory (DRAM) devices, static random access memory (SRAM) devices, flash memory devices, and so forth. The persistent storage 126 can be implemented using a storage device or multiple storage devices (such as a solid state storage device, a disk-based storage device, and so forth).

A communication flow between the host entities 102 and 104 that traverses multiple VNFs of the collection of VNFs 108 can involve multiple traversals through the TCP/IP stack 118 of the kernel 116 as data packets are exchanged among the VNFs. The communication of the data packets through the TCP/IP stack 118 involves multiple context switches.

In accordance with some implementations of the present disclosure, a communication between VNFs in the network system 106 can avoid passing through the TCP/IP stack 118. Instead, the communication between VNFs is intercepted by an intercept module in the user space 112. In some examples, the intercept module is in the form of a redirection wrapper 128. The redirection wrapper 128 is a wrapper for a library of routines 130 (which are also part of the user space 112). The routines of the library 130 can be invoked by the VNFs for establishing a connection between VNFs and passing data packets between the VNFs. The redirection wrapper 128 can be an extension of the library 130 of routines, where the redirection wrapper 128 is added to support the data communication redirection according to some implementations of the present disclosure.

By using an interface module such as the redirection wrapper 128 in the user space 112 to perform data communication redirection between virtual processes, the kernel 116 would not have to be modified to support the data communication redirection. The interface module such as the redirection wrapper 128 is a form of virtual switch that allows data to be communicated between VNFs without passing through the TCP/IP stack 118. A data path 129 in such implementations extend between VNFs through the "virtual switch" that is in the form of the redirection wrapper 128.

In some examples, the library of routines 130 includes a GNU C library, also referred to as glibc, as provided by the GNU Project. In other examples, other types of routine libraries can be employed. More generally, an intercept module can be implemented using any type of program in the user space 114, such as a plugin module, a script, and so forth.

A wrapper refers to a routine associated with the library 130 to perform specified tasks. In the example of FIG. 1, the redirection wrapper 128 is used to intercept calls made by a VNF that would otherwise trigger an action by the TCP/IP stack 118. The redirection wrapper 128 is able to redirect communication of data between VNFs such that the TCP/IP stack 118 of the kernel 116 is not invoked.

For example, the redirected data can pass through a communication channel, which can be implemented as a shared memory. Data can be written by a first VNF to the shared memory (e.g., implemented using a virtual memory or a physical memory that is part of the memory 122), and the written data can be retrieved by a second VNF. As another example, the communication channel can be implemented using a shared variable, where a first VNF can issue a notify event to a second VNF when the first VNF updates the shared variable, such as with a data packet to be communicated. The second VNF is notified because the second VNF is watching or monitoring the shared variable.

More generally, the interface module such as the redirection wrapper 128 supports a form of inter-process communication (IPC) that bypasses the TCP/IP stack 118 of the kernel 116. By implementing the IPC according to some examples, data communications in response to calls made by VNFs can be performed in a faster and more efficient manner than possible when the TCP/IP stack 118 of the kernel 116 is employed.

Examples of routines included in the library 130 include a socket open routine, a socket close routine, a socket send routine, a socket receive routine, and a socket connect routine. A socket can refer to an inter-process communication channel, such as a channel between VNFs or other virtual processes. A socket can be represented by a file descriptor in some examples.

A socket open routine is used to create a socket, while a socket close routine is used to destroy a socket. A socket open or close routine can be invoked by a corresponding socket open call or socket close call from a VNF. The socket connect routine, invoked by a socket connect call, can be used to establish a connection with a socket that has been created, where this connection is between VNFs. The socket send routine, invoked by a socket send call, is used for sending data across an established connection. The socket receive routine, invoked by a socket receive call, is used to receive data across a connection.

Although specific routines are referred to as being part of the library of routines 130, it is noted that in other examples, the library of routines 130 can include other types of routines relating to communication of data between VNFs or other virtual processes.

As shown in FIG. 1, the library of routines 130 and the redirection wrapper 128 are part of the user space 112 of the network system 106. By being able to intercept the communication of data between VNFs such that the data is redirected across a communication channel that does not invoke the kernel 116, data communication between VNFs can be achieved in the user space 112 such that context switching between a user process in the user space (e.g., a VNF) and a process in the kernel space 114 (e.g., the TCP/IP stack 118) does not have to be performed.

Figure 2:
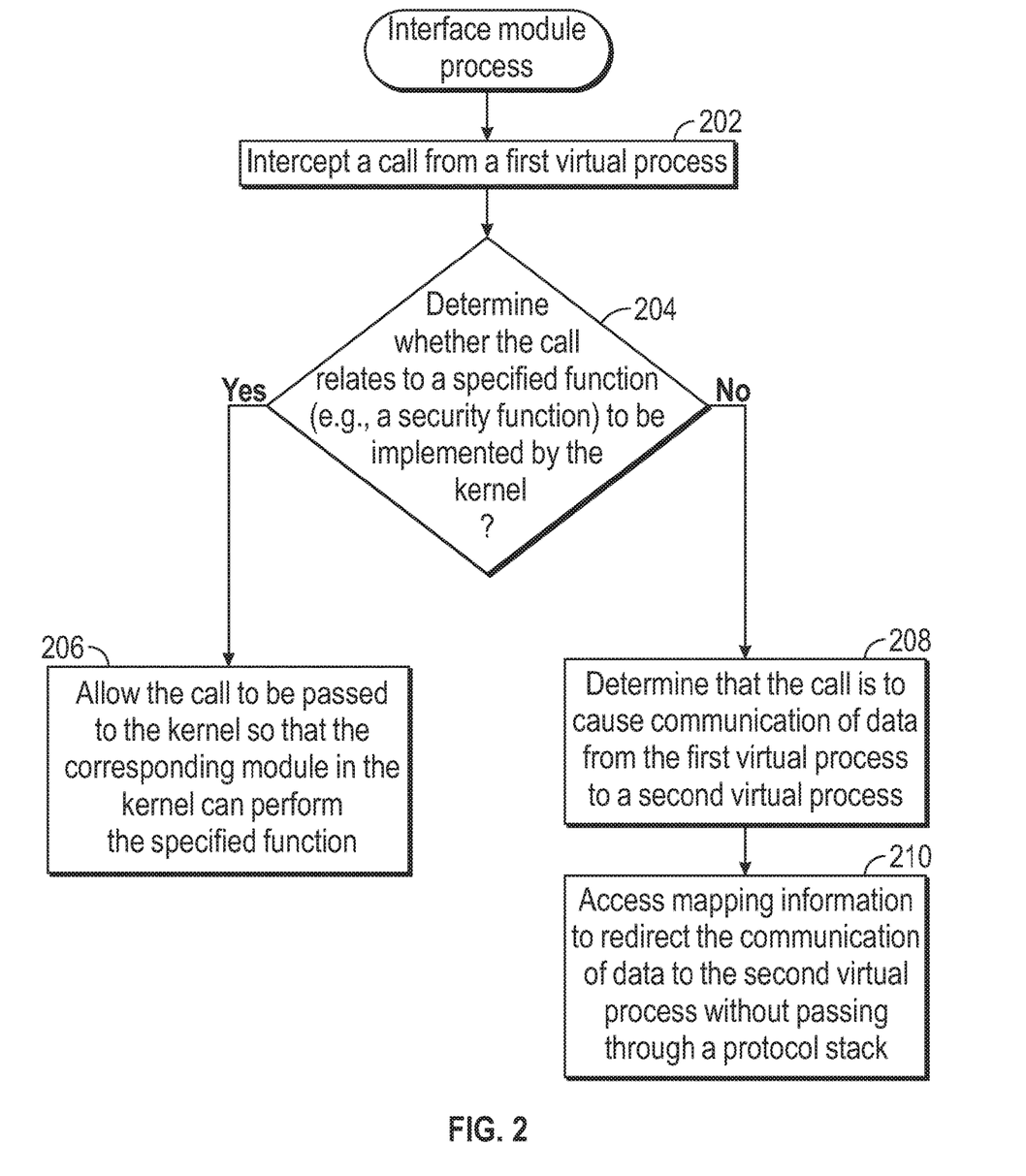
FIG. 2 is a flow diagram of a process performed by an interface module according to some examples.

FIG. 2 is a flow diagram of a process that can be performed by an interface module, such as the redirection wrapper 128 according to some examples. Although a specific order of tasks is shown in FIG. 2, it is noted that in other examples, the tasks can be performed in a different order, and/or additional or alternative tasks can be employed.

The interface module (in the user space 112) intercepts (at 202) a call from a first virtual process (e.g., the VNF 108-1 in FIG. 1). In some examples, the call can include a call to invoke a routine of the library of routines 130. Intercepting a call can refer to receiving and processing the call for the purpose of determining an action to take in response to the call.

The interface module determines (at 204) whether the call relates to a specified function (e.g., a security function) to be implemented by the kernel 116. For example, the call may involve a network address or network port, a sender, or a recipient, for which a security function, such as a deep packet inspection, an access control list (ACL) check, and so forth, is to be performed for determining whether or not a data packet is to be passed through from the sender to the recipient. A deep packet inspection refers to an inspection of the content of the data packet to determine whether the content violates a criterion or matches a specified signature. An ACL specifies permissions associated with an object such as a data packet, and the ACL check determines whether the data packet satisfies the permissions.

If the call relates to the specified function, then the kernel 116 would have to be invoked to perform the specified function. For example, a firewall, a port blocking module, an ACL checking module, or some other module of the kernel 116 can be invoked to perform the specified function. A call that relates to the specified function should involve processing by a module in the Kernel 116, and therefore, for such a call, the kernel 116 should not be bypassed.

Responsive to determining that the call relates to the specified function to be implemented by the kernel, the interface module allows (at 206) the call to be passed to the kernel so that the corresponding module in the Kernel 116 can perform the specified function. More specifically, the call can be allowed to invoke a respective routine of the library of routines 130, where the invoked routine interacts with the kernel 116 to perform a task specified by the call.

Responsive to determining that the call does not relate to the specified function to be implemented by the kernel 116, the interface module performs tasks 208 and 210. In task 208, the interface module determines that the call is to cause communication of data from the first virtual process to a second virtual process (e.g., VNF 108-2 in FIG. 1). The interface module makes this determination by determining whether the call is to invoke a routine in the library 130 that invokes a communication of data, such as a socket send routine or a socket receive routine.

The determination of whether the call relates to the specified function can be accomplished using a check of configuration information that is stored by the network system 106. The configuration information can specify that certain network addresses, network ports, senders, and/or recipients are to be associated with performance of the specified function. In other examples, other parameters can be used for checking whether or not a call relates to the specified function. Such parameters can be stored in a storage medium. As yet further examples, an indication can be stored in mapping information (discussed further below) for indicating whether or not a call relates to the specified function.

In task 210, the interface module accesses mapping information to redirect the communication of data to the second virtual process without passing through the TCP/IP stack 118 (or another protocol stack) of the kernel 116. The mapping information (an example shown in FIG. 3) includes entries each including network addresses used in identifying a respective connection between corresponding virtual processes.

Figure 3:
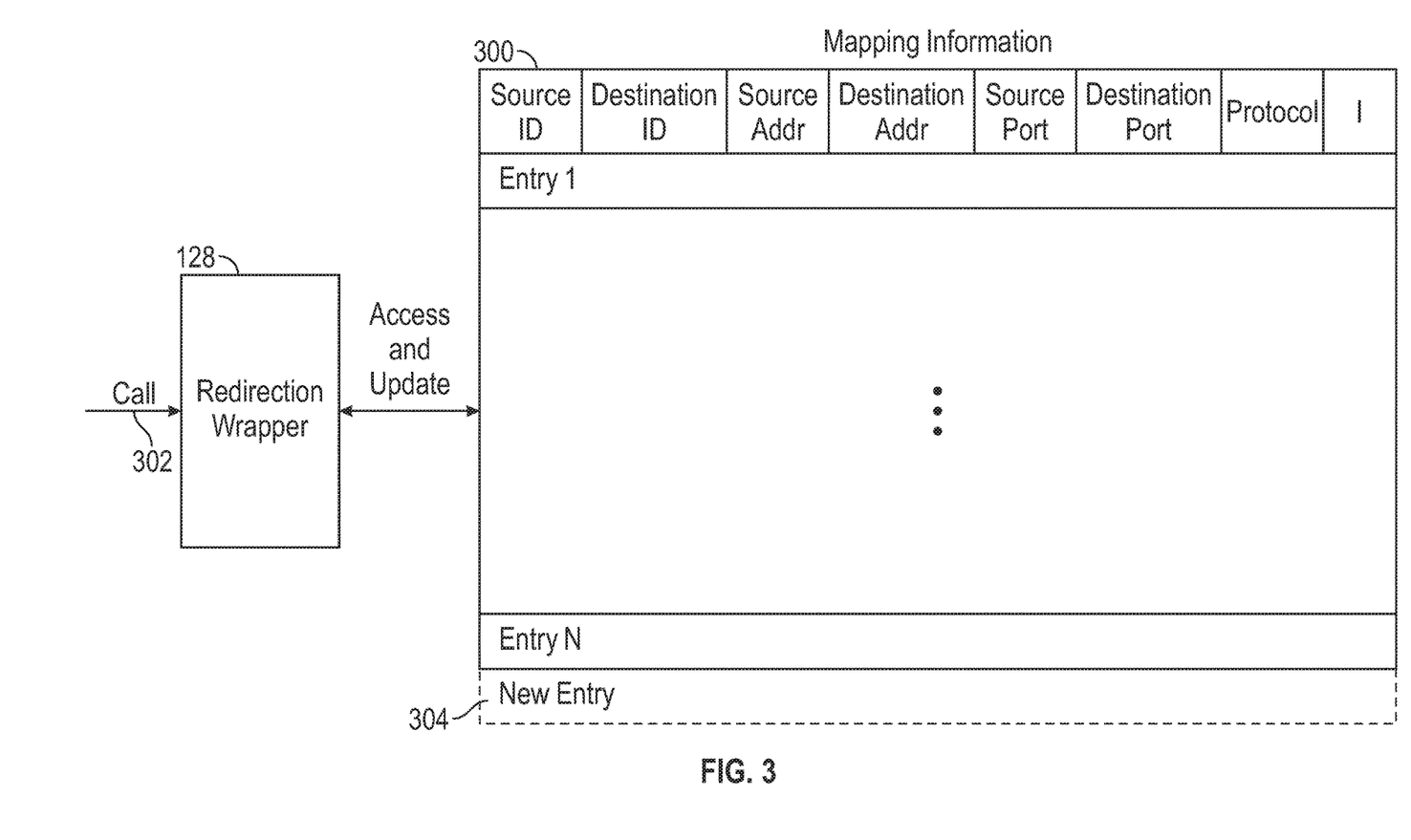
FIG. 3 is a block diagram of an arrangement including a redirection wrapper and mapping information according to some examples.

FIG. 3 shows an example of a mapping information 300 that can be accessed by the redirection wrapper 128. Although specific pieces of information are depicted in the example mapping information 300 of FIG. 3, it is noted that in other examples, additional or alternative pieces of information can be included in the mapping information 300.

The mapping information 300 can be stored in a storage, such as the memory 122 and/or the persistent storage 124 of FIG. 1.

The mapping information 300 can include multiple entries (entry 1 to entry N, N≥2 shown in FIG. 3). Each entry includes a the following fields: a source identifier (ID) that identifies a source virtual process, a destination ID that identifies a destination virtual process, a source address (e.g., a source IP address) of the source virtual process, a destination address (e.g., a destination IP address) of the destination virtual process, a source port (e.g., a source TCP or UDP port number) of the source virtual process, a destination port (e.g., a destination TCP or UDP port number) of the destination virtual process, protocol information that specifies a protocol used (e.g., TCP or UDP), and an indicator (I).

The source address, destination address, source port, destination port, and protocol information collectively form a 5-tuple that uniquely identifies a corresponding connection between the source and destination virtual processes, such as the VNFs 108-1 and 108-2.

FIG. 3 further shows the redirection wrapper 128 receiving a call 302 from the source virtual process (e.g., the VNF 108-1 in FIG. 1). For example, the call 302 can include a socket send call to send data to a destination virtual process (e.g., the VNF 108-2 in FIG. 1). More generally, the call 302 can specify data communication from a source virtual process (identified by a source ID) to a destination virtual process (identified by a destination ID).

The source ID and the destination ID of the call 302 maps to a respective entry of the mapping information 300. The redirection wrapper 128 can retrieve the mapped entry from the mapping information 300, and can use the 5-tuple of the retrieved entry to send a data packet (or data packets) associated with the call 302 to the destination virtual process. For example, the redirection wrapper 128 can add a header to a data packet to be communicated between the source and destination virtual processes, where the header includes the 5-tuple relating to the connection.

In the example of FIG. 3, the indicator (I) in each entry can be used to indicate whether or not a corresponding call received by the redirection wrapper 128 is to invoke a specified function, such as a security function. If the indicator (I) of an entry is set to a predefined value, then that indicates that the specified function is to be invoked, and the call can be allowed to pass to the kernel 116 for processing by the kernel 116, rather than performing redirection of the call that avoids invoking the TCP/IP stack 118 of the kernel 116 (as discussed above in connection with FIG. 2).

In other examples, the indicator (I) can be omitted from the entries of the mapping information 300.

In some examples, the mapping information 300 can initially be statically created and stored in the network system 106. For example, the mapping information 300 can be generated by a human or other entity (a program or machine) based on a configuration of the collection of VNFs 108. Topology information can specify what VNFs are connected to what other VNFs, so that the mapping information 300 can be populated using the topology information relating to connections between VNFs in the collection of VNFs 108.

In accordance with some implementations of the present disclosure, the redirection wrapper 128 is also able to dynamically update the mapping information 300. For example, in some cases, new VNFs can be created and added to the collection of VNFs 108, or alternatively, new connections between VNFs can be created. In such cases, corresponding new entries (e.g., 304 in FIG. 3) can be added to the mapping information 300, or existing entries of the mapping information 300 can be modified.

As an example of how a new connection can be created (either between existing VNFs or between a new pair of VNFs), the redirection wrapper 128 can monitor for certain calls, such as a socket open call and a socket connect call. The socket open call creates a socket. In the socket open call, a virtual process can provide a source IP address, a source port number, and protocol information identifying the protocol used (e.g., TCP or UDP).

The redirection wrapper 128 can respond to the open socket call by populating the new entry 304 of the mapping information 300 using the information received from the socket open call. Such information populated into the new entry can include the source ID of the virtual process that issued the socket open call, the source IP address, the source port number, and the protocol information.

Subsequently, after the socket has been created by the socket open call, a destination virtual process can issue a socket connect call to establish a connection with the socket. The socket connect call can provide the remaining pieces of information to be added to the new entry 304, including the destination ID, destination IP address, and the destination port number. At this point, the new entry 304 is fully populated, and can be used by the redirection wrapper 128 for redirecting data communications away from the TCP/IP stack 118 of the kernel 116.

Since the redirection wrapper 128 or other interface module is able to manage the mapping information 300, the actual routines of the library of routines 130 do not have to be modified to support the redirection of data communication away from the TCP/IP stack 118 of the kernel 116 according to some implementations of the present disclosure.

Figure 4:
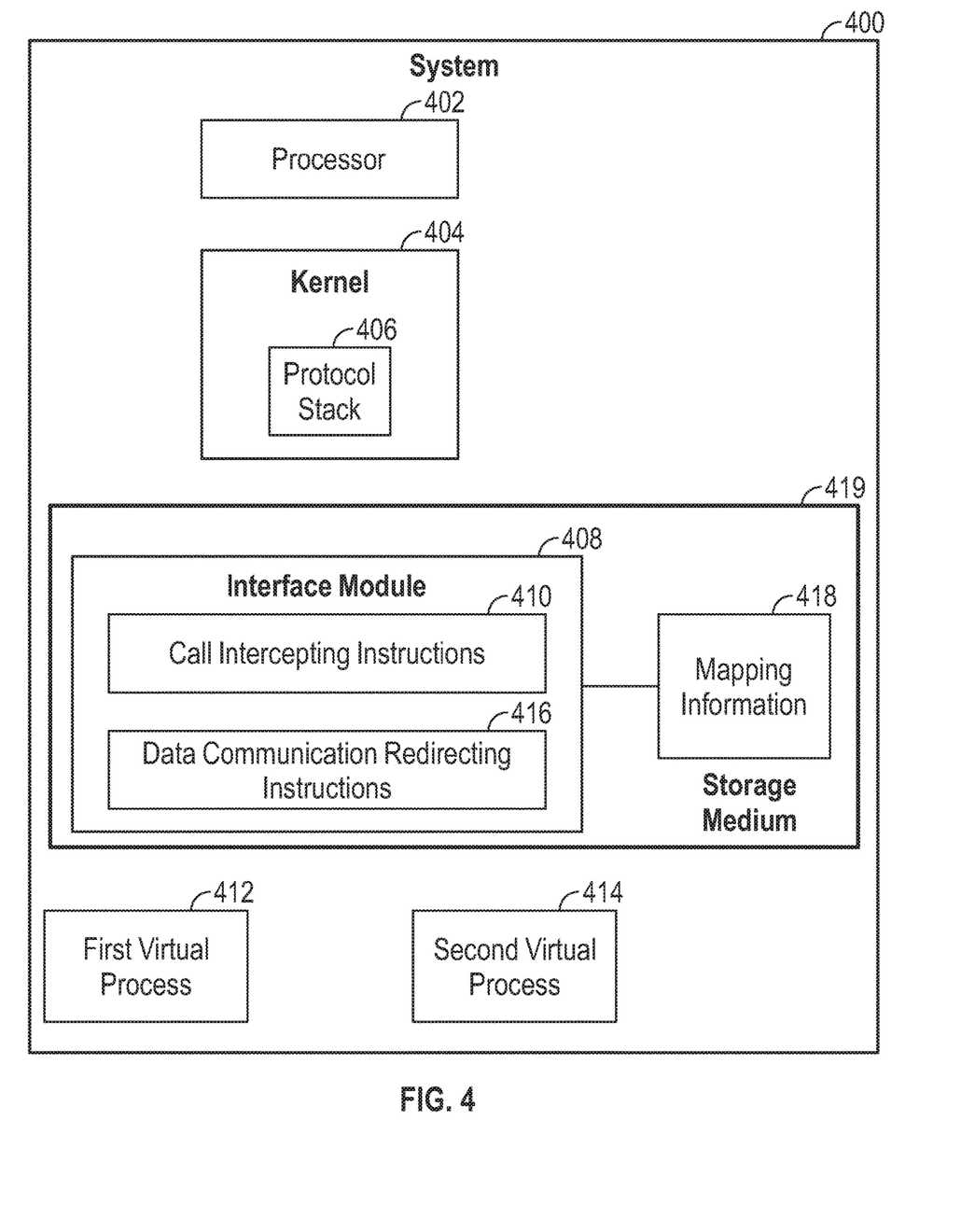
FIG. 4 is a block diagram of a system according to some examples.

FIG. 4 is a block diagram of a system 400 including a hardware processor 402 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 400 includes a kernel 404 that has a protocol stack 406 for use in network communications between processes. The system 400 further includes an interface module 408 (e.g., the redirection wrapper 128 of FIG. 1) in a user space and executable on the hardware processor 402 to perform various tasks. Machine-readable instructions such as the interface module 408 executable on a hardware processor can refer to the instructions executable on a single hardware processor or the instructions executable on multiple hardware processors.

The interface module 408 includes call intercepting instructions 410 that intercepts a call from a first virtual process 412, the call to cause communication of data from the first virtual process 412 to a second virtual process 414.

The interface module 408 further include data communication redirecting instructions 416 to access mapping information 418 (similar to the mapping information 300 of FIG. 3, for example) to redirect the communication of data to the second virtual process 414 without passing through the protocol stack 406 of the kernel 404. The mapping information 418 includes entries each including network addresses used in identifying a respective connection between corresponding virtual processes. The redirected data communication can communicate data over a communication channel between the first and second virtual processes 412 and 414 that does not pass through the protocol stack 406. The communication channel can include a shared memory, a shared variable, and so forth.

The interface module 408 and the mapping information 418 can be stored in a storage medium 419.

In some examples, the interface module 408 is able to modify the mapping information 418 for a new connection between virtual processes, such as due to the creation of a new virtual process or the establishment of a new connection between existing virtual processes. The interface module 408 receives information relating to establishment of the new connection, and adds the information for the new connection to a new entry of the mapping information. The information relating to the establishment of the new connection can include information included in a call to open a socket and a call to connect to the socket, for example. The information relating to the establishment of the new connection can further include a first network address and a first network port of the first virtual process 412, and a second network address and a second network port of the second virtual process 414.

In some examples, in response to a call, the interface module 408 determines whether the call relates to a specified function (e.g., a security function) to be implemented by the kernel 404. If the call relates to the specified function, then the interface module 408 allows the call to be passed to the kernel 404 for processing of the call by the kernel 404, and does not invoke the data communication redirecting instructions 416 for redirecting data communication that bypasses the protocol stack 406 of the kernel 404.

However, if the call does not relate to the specified function to be implemented by the kernel, then the data communication redirecting instructions 416 for redirecting data communication are invoked.

Figure 5:
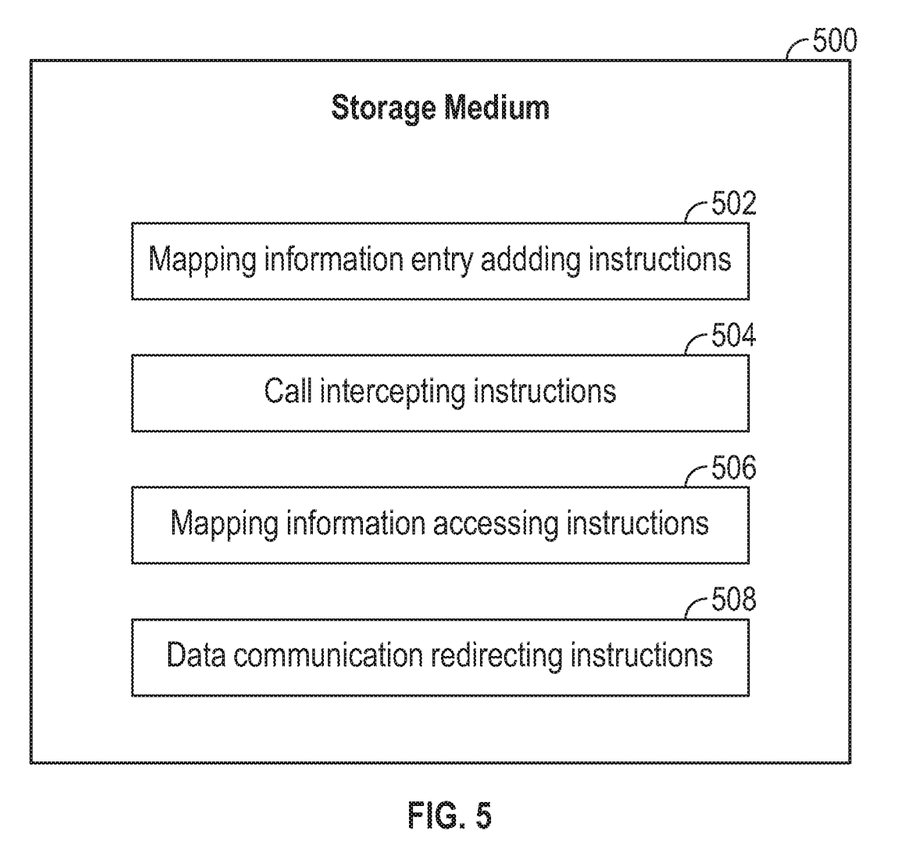
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The machine-readable instructions include mapping information entry adding instructions 502 to add, by an interface module in a user space of the system, an entry to mapping information in response to detecting a new connection between virtual processes, the entry including network addresses for identifying the new connection.

Adding the entry to the mapping information in response to detecting the new connection between virtual processes includes receiving, from the first virtual process, a call to open a socket, receiving, from the second virtual process, a call to connect to the socket, and obtaining information associated with the call to open the socket and the call to connect to the socket to add information to the added entry.

The machine-readable instructions further include call intercepting instructions 504 to intercept, by the interface module, a call from a first virtual process, the call to cause communication of data from the first virtual process to a second virtual process.

The machine-readable instructions further include mapping information accessing instructions 506 to access, by the interface module, the mapping information to obtain information useable to communicate over a first connection between the first virtual process and the second virtual process.

The machine-readable instructions further include data communication redirecting instructions 508 to redirect, by the interface module, the communication of data from the first virtual process to the second virtual process over the first connection without passing through a protocol stack of the kernel. The redirecting of the communication of data from the first virtual process to the second virtual process over the first connection avoids invoking the kernel to perform the communication of data from the first virtual process to the second virtual process.

The storage medium 419 (FIG. 4) or 500 (FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

What is claimed is:

1. A computer system comprising:
    a processor;
    a system kernel; and
    a non-transitory memory device storing instructions that when executed by the processor cause the computer system to facilitate an interface module in a user space and executable on the processor to:
    intercept a call from a first virtual process, wherein the call forwards a data packet from the first virtual process to a second virtual process, wherein the first and second virtual processes operate on the computer system;
    access mapping information comprising one or more entries, wherein a respective entry includes a mapping between network addresses used in identifying a respective connection between corresponding virtual processes; and
    in response to determining that the call does not relate to a function to be implemented by the system kernel, redirect the data packet from the first virtual process to the second virtual process using the mapping information instead of traversing a network protocol stack of the computer system wherein the system kernel includes a protocol stack that facilitates network communications between processes.

2. The computer system of claim 1, wherein the interface module comprises a wrapper of a library of routines.

3. The computer system of claim 1, wherein data communication between the first and second virtual processes comprises an inter-process communication.

4. The computer system of claim 1, wherein the interface module is executable on the processor to: modify the mapping information for a new connection between virtual processes.

5. The computer system of claim 4, wherein the interface module is executable on the processor to modify the mapping information by:
    receiving information associated with establishment of the new connection, and
    adding the information for the new connection in an entry of the mapping information.

6. The computer system of claim 5, wherein the information relating to the establishment of the new connection comprises a first network address and a first network port of one virtual process, and a second network address and a second network port of another virtual process.

7. The computer system of claim 1, wherein the interface module is executable on the processor to:
    intercept a second call from a virtual process;
    determine whether the second call relates to the function to be implemented by the system kernel; and
    responsive to determining that the second call relates to the function to be implemented by the system kernel, allow the second call to pass to the system kernel for processing by the system kernel.

8. The computer system of claim 7, wherein the function to be implemented by the system kernel comprises a security function.

9. The computer system of claim 1, wherein the interface module is executable on the processor to: allow a second call from a virtual process to pass to the system kernel, and create an entry of the mapping information using information received based on information provided by the system kernel in processing the second call.

10. The computer system of claim 1, wherein the first and second virtual processes comprise virtual network functions.

11. The computer system of claim 1, wherein the protocol stack comprises a Transmission Control Protocol/Internet Protocol (TCP/IP) stack.

12. A non-transitory machine-readable storage medium comprising instructions that upon execution cause a processor of a computer system to:
    maintain a system kernel in a kernel space of the computer system;
    intercept, by an interface module in a user space of the computer system, a call from a first virtual process, wherein the call forwards a data packet from the first virtual process to a second virtual process, wherein the first and second virtual processes operate on the computer system;

access, by the interface module, mapping information comprising one or more entries, wherein a respective entry includes a mapping between network addresses useable to communicate over a connection between virtual processes; and in response to determining that the call does not relate to a function to be implemented by the system kernel, redirect, by the interface module, the data packet from the first virtual process to the second virtual process using the mapping information instead of traversing a protocol stack of the computer system, wherein the system kernel includes a protocol stack that facilitates network communications between processes.

13. The non-transitory machine-readable storage medium of claim 12, wherein the redirecting of the data packet from the first virtual process to the second virtual process avoids the kernel space.

14. The non-transitory machine-readable storage medium of claim 12, wherein the instructions upon execution cause the processor further to add an entry to the mapping information in response to detecting a new connection between the first and second virtual processes, wherein detecting the new connection comprises: receiving, from the first virtual process, a call to open a socket; receiving, from the second virtual process, a call to connect to the socket; and obtaining information associated with the call to open the socket and the call to connect to the socket to add information to the added entry.

15. The non-transitory machine-readable storage medium of claim 12, wherein the network addresses in the entry comprises a network address of one of the virtual processes, and a network address of another of the virtual processes.

16. The non-transitory machine-readable storage medium of claim 12, wherein the entry comprises a network address and a network port of one of the virtual processes, a network address and a network port of another of the virtual processes, and information of a protocol used for the connection.

17. The non-transitory machine-readable storage medium of claim 12, wherein the instructions upon execution cause the processor further to:

determine whether a second call from a virtual process relates to the function to be implemented by the system kernel, and responsive to determining that the second call relates to the function to be implemented by the system kernel, allow the second call to pass to the system kernel for processing by the system kernel.

18. A method comprising:

maintaining a system kernel in a kernel space of a computer system;

intercepting, by an interface module in a user space of the computer system comprising a hardware processor, a call from a first virtual process;

determining, by the interface module, that the call forwards a data packet from the first virtual process to a second virtual process, wherein the first and second virtual processes operate on the computer system;

accessing, by the interface module, mapping information comprising one or more entries, wherein a respective entry includes a mapping between network addresses used in identifying a respective connection between corresponding virtual processes; and in response to determining that the call does not relate to a function to be implemented by the system kernel, redirecting the data packet from the first virtual process to the second virtual process using the mapping information instead of traversing a network protocol stack of the computer system, wherein the computer system supports a system kernel that includes a protocol stack facilitating network communications between processes.

19. The method of claim 18, wherein redirecting of the data packet further comprises:

determining whether a second call from a virtual process relates to the function to be implemented by the system kernel;

in response to determining that the second call relates to the function to be implemented by the kernel, allowing the second call to pass to the system kernel for processing by the system kernel.

* * * * *